(12) United States Patent
Otake

(10) Patent No.: US 7,064,943 B2
(45) Date of Patent: Jun. 20, 2006

(54) BOOST-TYPE SWITCHING POWER DEVICE

(75) Inventor: Tetsushi Otake, Tsurugashima (JP)

(73) Assignee: Toko Kabushiki Kaisha (JP)

( * ) Notice: Subject to any disclaimer, the term of this patent is extended or adjusted under 35 U.S.C. 154(b) by 390 days.

(21) Appl. No.: 10/436,386

(22) Filed: May 12, 2003

(65) Prior Publication Data

US 2003/0210504 A1   Nov. 13, 2003

(30) Foreign Application Priority Data

May 10, 2002   (JP) .............................. 2002-135310

(51) Int. Cl.
*H02H 7/10*   (2006.01)

(52) U.S. Cl. .................... 361/58; 361/18; 363/56.1; 363/56.3

(58) Field of Classification Search .................. 361/58, 361/18, 56.07, 56.1, 56.03; 363/56.1, 56.3
See application file for complete search history.

(56) References Cited

U.S. PATENT DOCUMENTS

| | | | | |
|---|---|---|---|---|
| 3,078,410 A | * | 2/1963 | Thomas | 323/278 |
| 3,109,980 A | * | 11/1963 | Wiley | 323/278 |
| 4,147,996 A | * | 4/1979 | Gontowski, Jr. | 331/111 |
| 4,207,479 A | * | 6/1980 | Yamamoto et al. | 307/116 |
| 4,389,638 A | * | 6/1983 | Gontowski, Jr. | 340/384.4 |
| 5,596,465 A | * | 1/1997 | Honda et al. | 361/18 |
| 5,995,386 A | * | 11/1999 | John et al. | 363/21.18 |

* cited by examiner

*Primary Examiner*—Brian Sircus
*Assistant Examiner*—Zeev Kitov
(74) *Attorney, Agent, or Firm*—Renner, Kenner, Greive, Bobak, Taylor & Weber

(57) ABSTRACT

A boost-type switching power device which obtains a dc output by connecting a rectifying diode to the output side of an inductance element, connected in series to a main switching element, the device including: a control circuit which controls the operation of the main switching element by using a feedback signal in accordance with the dc output; and a constant-current circuit comprising a plurality of active elements, which are provided between the the rectifying diode and the output terminal; and wherein, when there is an overload on the output side, the operation of the active elements comprising the constant-current circuit controls the control circuit, switching the main switching element off and thereby stopping the boost function, and, in addition, the output is controlled by the constant-current circuit.

3 Claims, 2 Drawing Sheets

BOOST-TYPE SWITCHING POWER DEVICE

BACKGROUND OF THE INVENTION

1. Field of the Invention

This invention relates to a boost-type switching power device, and more particularly relates to the boost-type switching power device comprising an overcurrent protection function.

2. Description of Related Art

A self-excited switching power source can achieve a desired output voltage with a simple circuit constitution; it can therefore be made inexpensively, and is widely used chiefly with comparatively small power sources. FIG. 4 shows how voltage is intermittently applied to the primary winding of a transformer T by switching a main switching element Q1 on and off based on the on-off operation of an auxiliary transistor Q2, the energy accumulated when the main switching element Q1 is on being output while it is off. The output is rectified by a rectifying diode D1 and smoothed by a smoothing capacitor C2 to obtain the boosted output voltage.

In the boost-type switching power device of such a constitution, when the load connected to the output side becomes overloaded due to an irregularity of some sort, this overload causes an overcurrent which damages the circuit elements along the current path.

SUMMARY OF THE INVENTION

It is an object of this invention to provide a boost-type switching power device which can prevent overcurrent causing damage and the like to circuit elements, even when there is overload, including a short-circuit in the load connected to the switching power. This invention also provides a device which can automatically return to normal operation after the overload has been cancelled.

This invention solves the problems mentioned above by appending a constant-current circuit to the output side and detecting overload of the constant-current circuit, the detected result being fed back to the switching element, whereupon the switching operation is terminated.

This invention provides a boost-type switching power device which obtains a dc output by connecting a rectifying diode to the output side of an inductance element, connected in series to a main switching element. The device comprises an auxiliary switching element which controls the operation of the main switching element by using a feedback signal from the output, and a constant-current circuit comprising a plurality of switching elements, which are provided between the rectifying diode and the output terminal. When there is an overload on the output side, the operation of the switching elements comprising the constant-current circuit controls the auxiliary switching element, switching the main switching element off and thereby stopping the boost function; in addition, the output is controlled by the constant-current circuit.

DESCRIPTION OF THE PREFERRED EMBODIMENTS

This invention can be applied in both self-excited and separately-excited devices. The self-excited device may be one which is vibrated by feedback from the secondary winding of the transformer, or a multivibrator type of device having a single winding. The circuit configuration of a constant-current circuit can be selected in accordance with the range of its functions.

Figure 1:
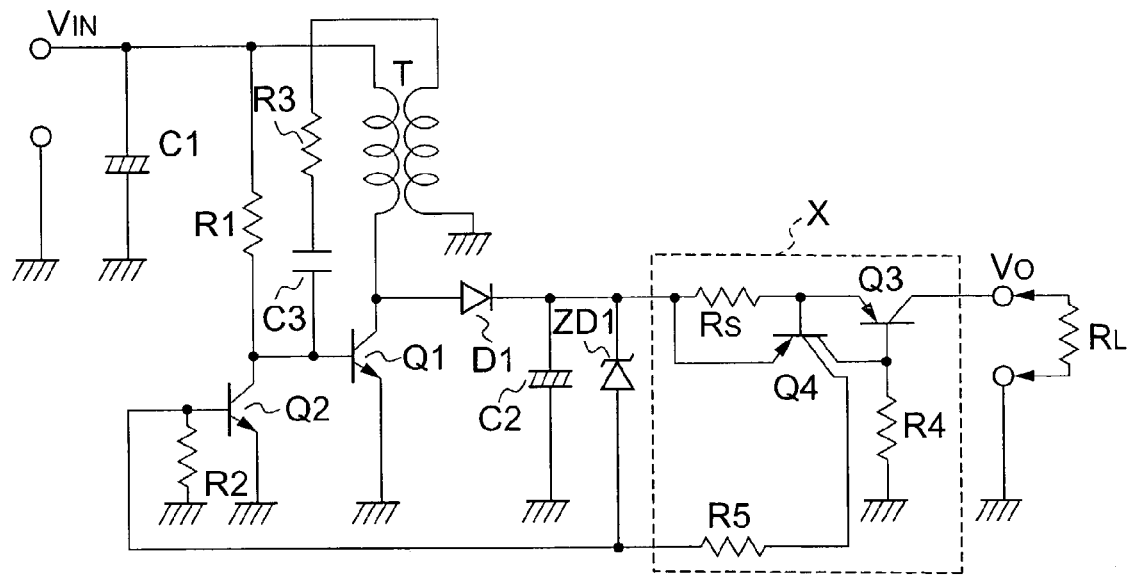
FIG. 1 is a circuit diagram of a self-excited boost-type switching power device according to an embodiment of this invention.
Figure 4:
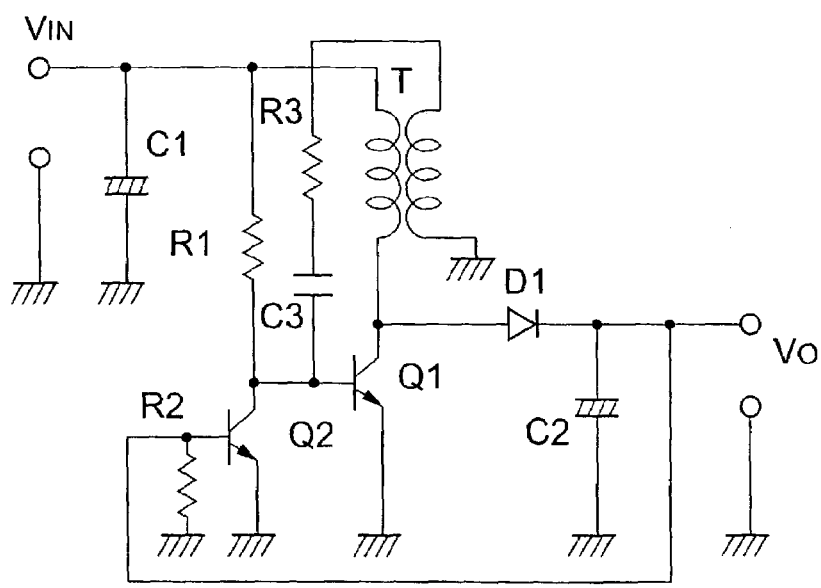
FIG. 4 is a circuit diagram of a conventional boost-type switching power.

A preferred embodiment of this invention will be explained with reference to the accompanying drawings. FIG. 1 is a circuit diagram showing an embodiment of this invention. The circuit configuration is substantially the same as that of the conventional configuration shown in FIG. 4, with the exception of section X which is enclosed by a broken line. Self-excited vibration is achieved using feedback from the secondary winding of the transformer, and feedback is relayed from the output side to the auxiliary transistor Q2.

In this embodiment, a detector resistor Rs and the main current path of a transistor Q3 are connected in series along the current path on the output terminal Vo side of a transistor Q4, the emitter of a transistor Q4 is connected to the input side of the resistor Rs, the base of the transistor Q4 is connected between the resistor Rs and the transistor Q3, and in addition, one of its multicollectors is connected between a bias current path resistor R4 and the base of the transistor Q3. The transistor Q4 has a multicollector structure, one of its collectors being connected to the base of the transistor Q3 and the other being connected via a resistor R5 to the anode of a constant-voltage diode ZD1, the cathode of which is connected between the diode Dl and the resistor Rs, and to the base of the transistor Q2 which controls the operation of the transistor Q1 comprising the main switching element.

An operation when this circuit is used with normal load will be explained. As in the conventional circuit shown in FIG. 4, a voltage of $$Vo > VIN, \text{ and}$$

$$Vo \approx VZD1$$

(where VZD1 is the Zenner voltage of the diode ZD1) is generated at both ends of the smoothing capacitor C2, a positive-bias is established between the base and emitter of the dc switch element Q3 via the resistor Rs, and the output voltage is supplied to the load RL.

An explanation will be given of the operation in the case where the load RL has short-circuited after regular operation, or where the power VIN has been injected while the load is still short-circuited. The detector resistor Rs positively biases the base and emitter of the multicollector transistor Q4, the voltage which is sufficient for continuity between the collector and the emitter of the transistor Q4 decreases, and continuity is established between the collector and the emitter of the transistor Q4.

Then, a sufficient positive bias is received between the base and the emitter of the transistor Q2 via the resistor R5, and the status switches from active operation to total ON status, whereby the transistor Q1 (main switching element) switches OFF. Consequently, the transistor Q1 stops switching, and the voltage between the collector and the emitter of the transistor Q3 becomes approximately VIN.

At the same time, the constant-current circuit comprised of the transistors Q3 and Q4 injects a short-circuited current Is, which was set beforehand by the resistor Rs, along the short-circuited path to ground (GND). However, as described above, the voltage-boost function stopped when the main switching element Q1 stopped switching, so that the power loss of the transistor Q3 is approximately VIN×Is.

If the transistor Q4 did not have a multicollector structure, and no collector was connected to the resistor R5, the power loss of the transistor Q3 would greatly increase. For instance, since the power for a fluorescent display tube requires a voltage Vo of around 50 V, the power loss at VIN of 12 V would be multiplied by five. In other words, by using a multicollector as the transistor Q4 and giving the transistor Q2 an OFF function, the power loss of the transistor Q3 can be reduced to one-fifth.

Figure 2:
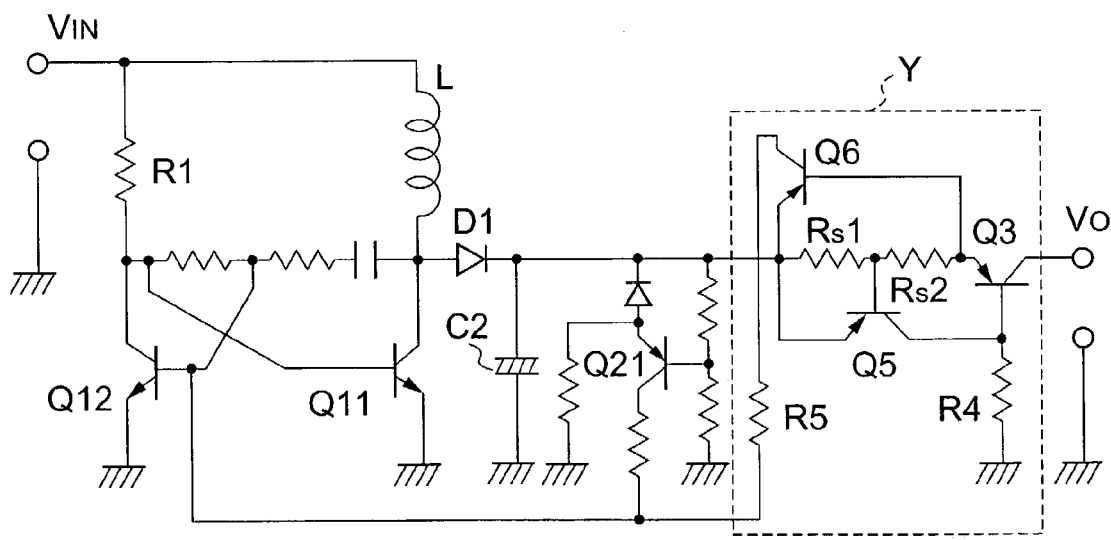
FIG. 2 is a circuit diagram of a self-excited boost-type switching power device according to another embodiment of this invention.

In the embodiment described above, the power is self-excited by inducing an ac voltage in the secondary winding of the transformer, and feeding it back to the base of the transistor Q1 comprising the main switching element, but the self-excited multi-vibrator type shown in FIG. 2 is acceptable. Of course, the switching element may be a MOSFET.

Furthermore, the section X enclosed by the broken line in FIG. 1 can be replaced by the section Y enclosed by the broken line in FIG. 2. Here, the detector resistor is divided into resistors Rs1 and Rs2, and the base of the transistor Q6 is connected to a point midway between them. In this example, the output side of the resistor Rs2 is connected to the base of an additional transistor Q6, the emitter of the transistor Q6 is connected to the input side of the resistor Rs1, and the collector of the transistor Q6 is connected via the resistor R5 to the base of an auxiliary transistor Q12. With this configuration, there is no need to use a multicollector.

Figure 3:
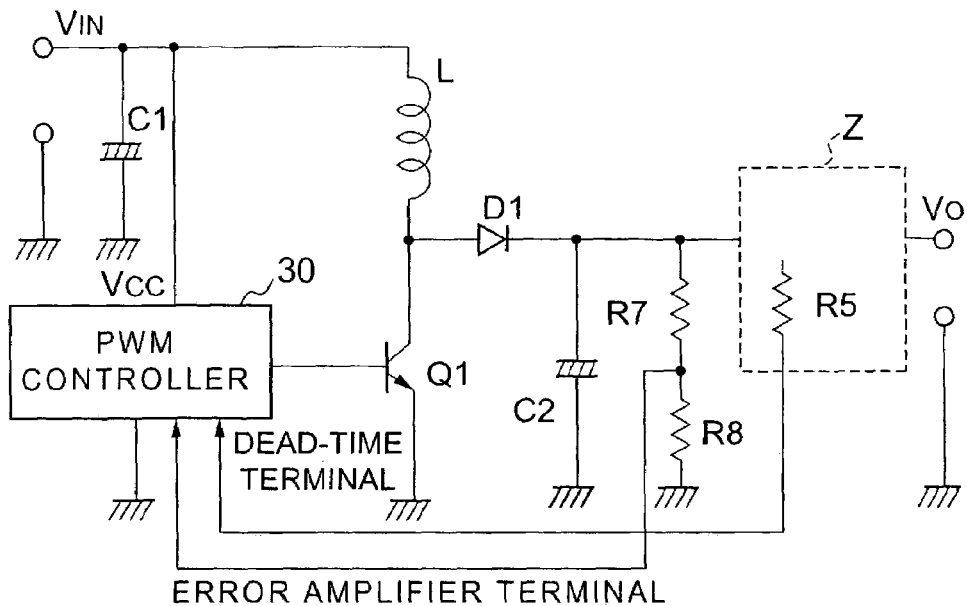
FIG. 3 is a circuit diagram of a separately-excited boost-type switching power device according to yet another embodiment of this invention.

This invention is not restricted to a self-excited boost-type switching power, and can be applied in a separately-excited power. As shown for example in FIG. 3, the circuit Z, enclosed by a broken line, can achieve the same functions as those of the section X enclosed by the broken line in FIG. 1 or the section Y enclosed by the broken line in FIG. 2 (switching off the main switching transistor Q1 and stopping the switching operation), by connecting the resistor R5 to the dead-time terminal of a PWM controller (control circuit) 30. In this case, an interface for inverting the polarity is used, depending on the logic of the dead-time function. Incidentally, the resistors R7 and R8 comprise voltage dividers which detect the dc output voltage, rectified by the diode D1; the detected voltage is connected to the error amplifier input terminal of the PWM controller (control circuit) 30, so as to control the output voltage. For example, the PWM controller (control circuit) 30 may comprise a dual switching regulator control IC TL1451 (manufactured by TI Corp.), or a similar IC or a circuit having similar functions.

When the overload status is cancelled, the drop in voltage detected by the detector resistor decreased, and it is possible to keep the transistor comprising the switching element of the current path operational while returning the auxiliary transistor or the control circuit to its original operation. This makes it possible to return to normal operations performed by the on-off switching of the main switching element.

This invention obtains a boost-type switching power device which can prevent overcurrent causing damage and the like to the elements, even when the load connected to the switching power reaches an overload state, including a short-circuit. There is an advantage that the device automatically returns to normal operation when the overload is cancelled.

What is claimed is:

1. A boost-type switching power device which obtains a dc output by connecting a rectifying diode to the output side of an inductance element, connected in series to a main switching element, the device comprising:

a control circuit which controls the operation of said main switching element by using a feedback signal from the output; and a constant-current circuit comprising a plurality of active elements, which are provided between the said rectifying diode and the output terminal; and wherein, when the current supplied to the output side has become overloaded, the operation of the active elements comprising said constant-current circuit controls the operation of said control circuit so as to switch off said main switching element and thereby stop the boost function, and, in addition, a current restricted to a predetermined size is supplied to the output side.

2. The boost-type switching power device as described in claim 1, wherein said constant-current circuit comprises a detector resistor for detecting current supplied to the output side, a first active element for supplying current to the output side, and a second active element for controlling the operation of the control circuit.

3. The boost-type switching power device as described in claim 2, a multicollector comprising first and second collectors being used as said second active element, and, when the current supplied to the output side has become overloaded, the output of said first collector is used to control the operation of said control circuit, and the output of said second collector is used to control the operation of said first active element.

* * * * *